(12) United States Patent
Marten (10) Patent No.: US 9,099,870 B2
(45) Date of Patent: Aug. 4, 2015

(54) CHARGE REDISTRIBUTION METHOD FOR CELL ARRAYS

(75) Inventor: Victor Marten, Flushing, NY (US)

(73) Assignee: Sendyne Corporation, New York, NY (US)

( * ) Notice: Subject to any disclaimer, the term of this patent is extended or adjusted under 35 U.S.C. 154(b) by 0 days.

(21) Appl. No.: 13/517,206

(22) PCT Filed: Jun. 9, 2012

(86) PCT No.: PCT/IB2012/052928
§ 371 (c)(1),
(2), (4) Date: Jun. 19, 2012

(87) PCT Pub. No.: WO2012/172468
PCT Pub. Date: Dec. 20, 2012

(65) Prior Publication Data
US 2014/0103857 A1    Apr. 17, 2014

Related U.S. Application Data

(60) Provisional application No. 61/495,988, filed on Jun. 11, 2011.

(51) Int. Cl.
*H02J 7/00* (2006.01)
*H01M 10/46* (2006.01)
(Continued)

(52) U.S. Cl.
CPC ........... *H02J 7/0013* (2013.01); *H01M 10/425* (2013.01); *H01M 10/441* (2013.01); *H01M 10/46* (2013.01); *H02J 7/0014* (2013.01);
(Continued)

(58) Field of Classification Search
CPC ...... H02J 7/0013; H02J 7/0014; H02J 7/0016
USPC ................. 320/103, 107–108, 116, 118–120, 320/127–128, 121
See application file for complete search history.

(56) References Cited

U.S. PATENT DOCUMENTS 5,659,237 A    8/1997  Divan et al.
5,821,729 A    10/1998  Schmidt et al.
(Continued)

FOREIGN PATENT DOCUMENTS

JP    2001-185229 A    7/2001
WO    2008/137764 A1   11/2008
(Continued)

OTHER PUBLICATIONS

Written Opinion for International application No. PCT/IB2012/052928 mailed Dec. 12, 2012.
(Continued)

*Primary Examiner* — Stacy Whitmore
(74) *Attorney, Agent, or Firm* — Oppedahl Patent Law Firm LLC (57) ABSTRACT

A topology is described in which each pair of cells in a string shares a single inductor. Switches permit the single inductor to selectively charge one or the other of the cells. In a variant of the topology, the inductor together with additional switches permit selectively charging multiple cells simultaneously (even one or both cells simultaneously in a pair of cells), drawing upon either an external energy source or upon one or multiple other cells in the string. In this way the number of inductors is minimized while providing isolation among the charging circuits.

8 Claims, 7 Drawing Sheets

(51) Int. Cl.
*H01M 10/42* (2006.01)
*H01M 10/44* (2006.01)

(52) U.S. Cl.
CPC ...... *H02J7/0019* (2013.01); *H01M 2010/4271* (2013.01); *H02J 7/0016* (2013.01); *H02J 2007/0059* (2013.01)

(56) References Cited

U.S. PATENT DOCUMENTS

| | | | |
|---|---|---|---|
| 6,100,663 A * | 8/2000 | Boys et al. | 320/108 |
| 6,511,764 B1 | 1/2003 | Marten | |
| 6,518,725 B2 | 2/2003 | Marten | |
| 7,936,150 B2 | 5/2011 | Milios | |
| 8,436,582 B2 * | 5/2013 | Pigott | 320/118 |
| 8,530,074 B2 * | 9/2013 | Krammer | 429/162 |
| 8,536,824 B2 * | 9/2013 | St-Jacques | 320/103 |
| 8,541,905 B2 * | 9/2013 | Brabec | 307/10.7 |
| 8,786,255 B2 * | 7/2014 | Gollob et al. | 320/116 |
| 2008/0116850 A1 | 5/2008 | Konishi et al. | |
| 2009/0278489 A1 * | 11/2009 | St-Jacques | 320/103 |
| 2010/0121511 A1 * | 5/2010 | Onnerud et al. | 701/22 |
| 2010/0123433 A1 * | 5/2010 | Guo | 320/118 |
| 2010/0295509 A1 | 11/2010 | Moussaoui et al. | |
| 2010/0295510 A1 * | 11/2010 | Moussaoui et al. | 320/118 |
| 2010/0304207 A1 * | 12/2010 | Krammer | 429/162 |
| 2011/0267005 A1 * | 11/2011 | Gollob et al. | 320/116 |
| 2012/0119746 A1 * | 5/2012 | Macris | 324/431 |
| 2012/0139492 A1 * | 6/2012 | Kleffel | 320/118 |
| 2012/0194134 A1 * | 8/2012 | Kain | 320/116 |
| 2012/0274283 A1 * | 11/2012 | van Lammeren | 320/118 |
| 2013/0002201 A1 * | 1/2013 | Bodkin et al. | 320/118 |
| 2013/0057200 A1 * | 3/2013 | Potts et al. | 320/107 |

FOREIGN PATENT DOCUMENTS

| | | |
|---|---|---|
| WO | WO 2011070517 A4 * | 8/2011 |
| WO | 2012/042401 A2 | 4/2012 |
| WO | 2012/056417 A2 | 5/2012 |
| WO | 2013095885 A1 | 6/2013 |

OTHER PUBLICATIONS

International Search Report for International application No. PCT/IB2012/052928 mailed Dec. 12, 2012.

* cited by examiner

CHARGE REDISTRIBUTION METHOD FOR CELL ARRAYS

This application claims the benefit of U.S. patent application Ser. No. 61/495,988 filed Jun. 11, 2011, which application is incorporated herein by reference for all purposes.

BACKGROUND

Inevitably as a series string of cells goes through its service life, a variety of events and conditions conspire to ensure that during discharge, one cell discharges fully sooner than its neighbors, and that during charge, one cell charges fully sooner than its neighbors. This prompts investigators to try to devise ways to balance the charge among the cells in the string. Experience shows, however, that it is not easy to balance the state of charge when several electrochemical cells are in series. For example if one wishes to selectively charge particular cells (for example to "top up" a particular cell that needs topping-up), the charging module for any particular cell needs to have isolation relative to any charging modules for other cells. The charging modules for the cells likewise need to have isolation relative to any external energy source being drawn upon for charging purposes.

But it is not enough merely to find a way to provide isolation mechanisms for the various charging modules. It is also necessary to find a way for each module to be individually controlled as to the current being applied by that module to its respective cell. The control mechanisms might be "local" to the respective cell or might be centralized. If centralized, then the control mechanisms must also be electrically isolated as needed.

A reader hoping to gain valuable background in the area of cell balancing and charge redistribution will find it helpful to review the following patent documents:

U.S. Pat. No. 6,518,725 B2 Marten issued Feb. 11, 2003
U.S. Pat. No. 6,511,764 Marten issued Jan. 28, 2003
WO 2008-137764 A1 published Nov. 13, 2008
U.S. Pat. No. 7,936,150 B2 to Milios issued May 3, 2011
WO 2012-042401 published on Apr. 5, 2012
WO 2012-056417 published on May 3, 2012

Investigators have proposed any of a wide variety of approaches for such balancing and charging. A patent of possible interest is US 2010-0295509 A1 to Moussaoui et al. published Nov. 25, 2010. A review of past proposed approaches reveals many drawbacks to various approaches. For example many approaches using inductive coupling require "snubbers", circuits to fight and to absorb transients that develop when current to an inductor is cut off. Snubbers for high-voltage circuits are particularly tricky to design. In the absence of a snubber, or in the absence of a snubber that is good enough to do the job, such a transient can lead to failure of the controlling device such as a switch.

Some approaches are costly in terms of the number or physical bulk of switches, inductors, or capacitors employed (per cell) to bring about the balancing or charging. Some approaches are disappointing in terms of the energy losses suffered during the balancing process. Some approaches only achieve charging based upon an external energy input but cannot redistribute charge between cells in a string. Some approaches only serve to discharge particular cells, throwing away energy merely to ensure that no cell performs better than the weakest cell in the strong.

It would be helpful if a family of approaches could be devised that would permit selective charging and balancing of cells in a string, using a minimum of expensive or bulky components per cell, with maximum efficiency and minimal operational losses.

SUMMARY OF THE INVENTION

A topology is described in which each pair of cells in a string shares a single inductor. Switches permit the single inductor to selectively charge one or the other of the cells. In a variant of the topology, the inductor together with additional switches permit selectively charging multiple cells simultaneously (even one or both cells simultaneously in a pair of cells), drawing upon either an external energy source or upon one or multiple other cells in the string. In this way the number of inductors is minimized while providing isolation among the charging circuits.

DESCRIPTION OF THE DRAWING

The invention is described with respect to a drawing in several figures, of which.

To the extent possible, like reference numerals are employed for like elements among the figures.

DETAILED DESCRIPTION

The beneficial aspects of the invention will be best appreciated with a brief review of earlier approaches for cell balancing.

Figure 1:
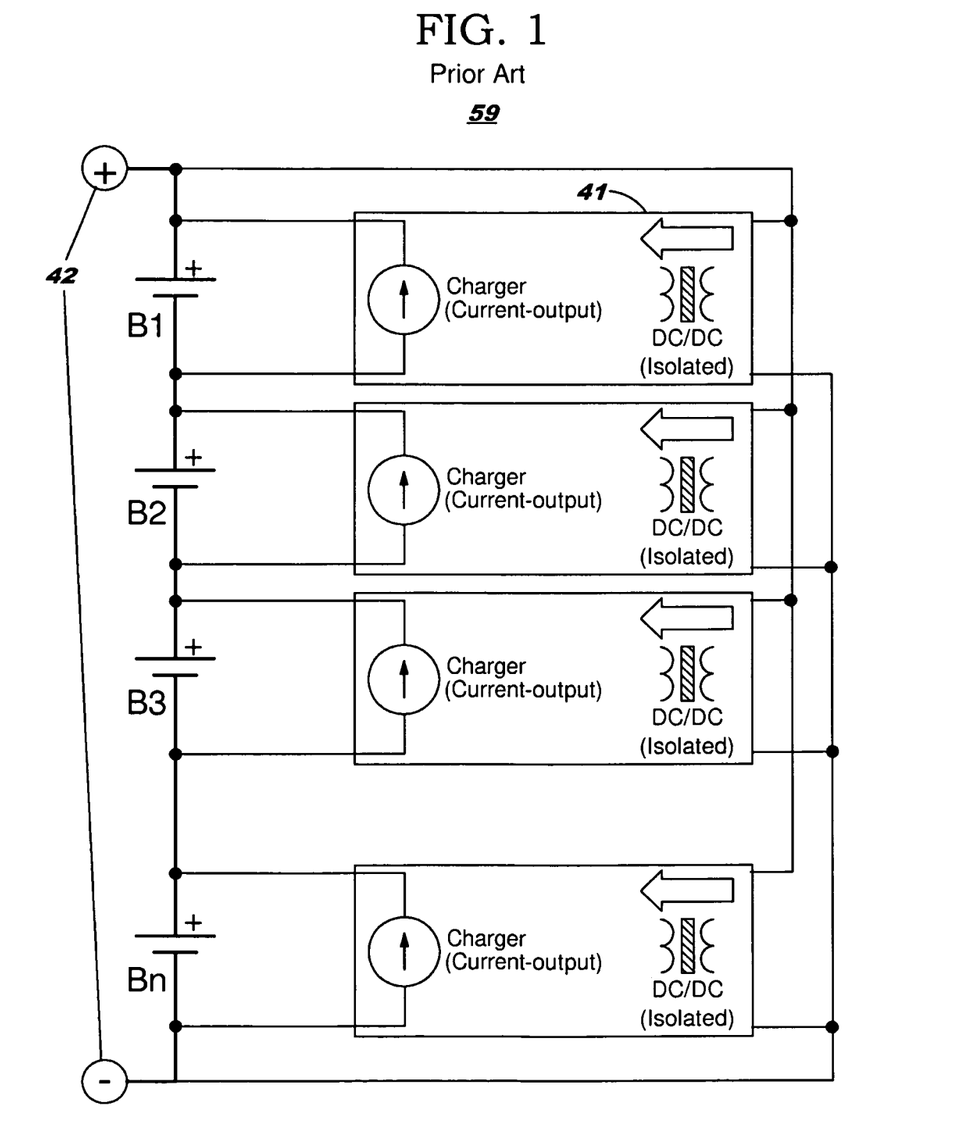
FIG. 1 shows a prior-art approach for balancing according to the above-mentioned U.S. Pat. No. 7,936,150.

FIG. 1 shows a prior-art approach 59 for balancing according to the above-mentioned U.S. Pat. No. 7,936,150. Each cell B1, B2, B3 . . . Bn has its own respective charger (for example charger 41). Each charger is DC/DC isolated from the other chargers and from a power source (shown here as the external positive and negative current terminals 42 for the cell string). If the number of cells is n, then the number of circuit elements in the chargers is n times the circuit elements in a particular single charger. For example if there is an inductor in each charger, then the system has n such inductors.

Figure 2:
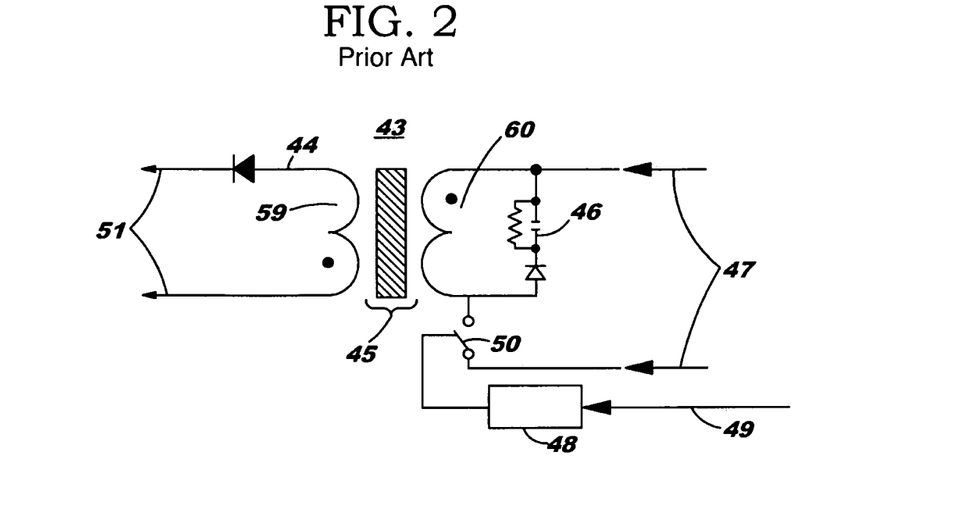
FIG. 2 shows a first approach for an isolated charger.

FIG. 2 shows a first approach for an isolated charger 43 using a "flyback" approach. A low voltage current output 51 is provided to a cell that is to be charged. Transformer 45 provides galvanic isolation. A high voltage current input 47 is provided to the transformer 45 as controlled by switch 50. A high voltage snubber 46 has to be provided and these are tricky to design and implement. A gate drive and control circuit 48 is controlled by a control line 49 from a battery management system, omitted for clarity in FIG. 2. The diode 44 provides operational simplicity but at a cost, namely that efficiency is degraded due to loss of any ability to draw power from any voltage swing that happens to go in the opposite direction in the inductor, and due to losses in the diode itself.

Figure 3:
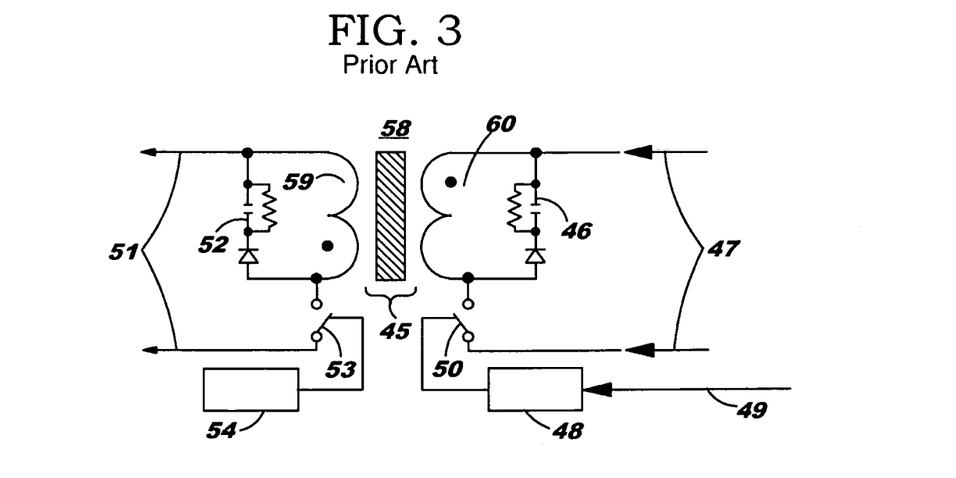
FIG. 3 shows a second approach for an isolated charger.

FIG. 3 shows a second approach for an isolated charger 58 using a "flyback" approach. Here again a low voltage current output 51 is provided to a cell that is to be charged. Transformer 46 provides galvanic isolation. A high voltage current input 47 is provided to the transformer 45 as controlled by switch 50. A high voltage snubber 46 has to be provided and, again, these are tricky to design and implement. A gate drive and control circuit 48 is controlled by a control line 49 from a battery management system, omitted for clarity in FIG. 3. Instead of a simple diode, a switch 53 is provided which is switched on and off in synchronous fashion, providing a synchronous rectifier function. For this to work, the switch 53 has to be driven by a synchronous gate drive and control circuit 54. Yet another snubber 52 must be provided to protect switch 53 from transients.

Figure 4:
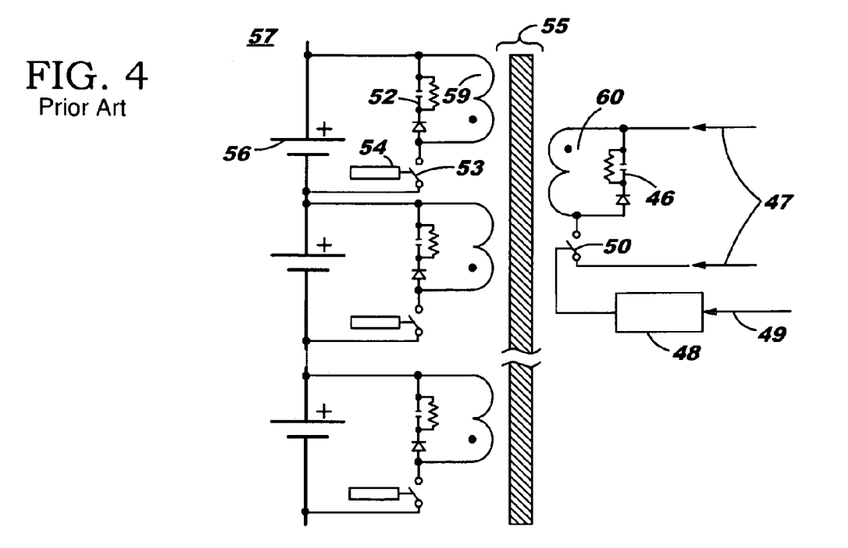
FIG. 4 shows a third approach for an isolated charger, drawing from the above-mentioned US published patent application number 2010-0295509.

FIG. 4 shows a third approach for an isolated charger 57, drawing from the above-mentioned US published patent application number 2010-0295509. Each cell 56 has a respective inductor (winding 59) and switch 53. Snubber 52 is also required as mentioned in connection with FIG. 3. The various inductors 59 are inductively coupled with inductor 60. Each switch 53 is controlled by a synchronous rectifier gate driver and control circuit 54.

Figure 5:
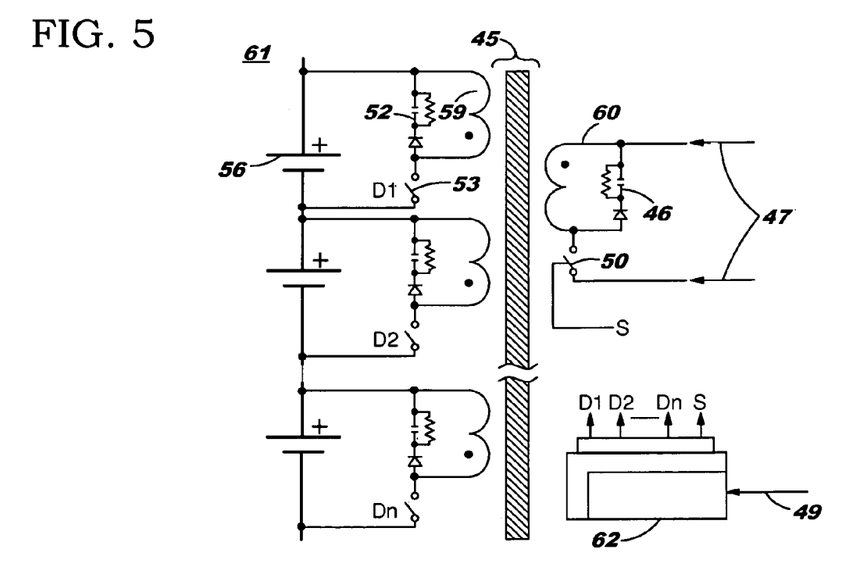
FIG. 5 shows a fourth approach for an isolated charger that is also able to discharge cells.

FIG. 5 shows a fourth approach for an isolated charger 61 that is also able to discharge cells. Each cell 56 has a respective inductor (winding 59) and switch 53. Snubber 52 is also required as mentioned in connection with FIG. 3. The various inductors 59 are inductively coupled with inductor 60. Each switch 53 is controlled by control from a centralized control and driver circuit 62. Individually isolated drives D1, D2, DN are provided to the switches 53. The high-voltage drive requires a high-voltage snubber 46 as discussed above. The circuit 62 is rather complex and probably needs to be a high-gate-count field-programmable gate array.

Advantageously, this approach 61 permits pulling energy from any one of the cells such as 56 and permits pumping that energy (or most of that energy) into any other one of the cells such as 56. But this approach still has drawbacks like some other approaches just mentioned above, for example that if the number of cells is n, then the number of chargers is n and the component count (such as the number of inductors 59) is also n.

Figure 6:
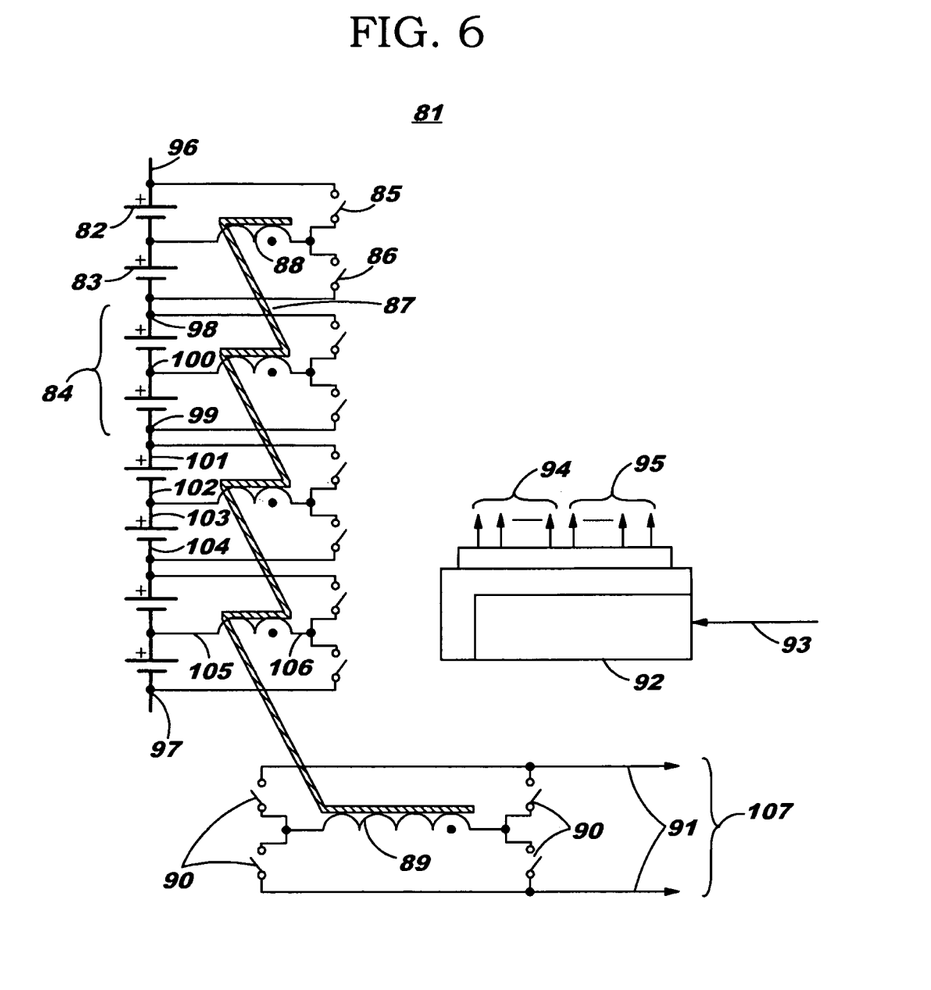
FIG. 6 shows a first approach according to the invention.

FIG. 6 shows a first approach 81 according to the invention. (It should be noted that to avoid having to squeeze too many reference numerals too closely together, typical reference numerals are spread out among the various cell assemblies but the alert reader will have no difficulty understanding that these are typical and indicative of important elements of each of the various cell assemblies.)

We see a plurality of cell assemblies (of which 84 is typical) each having a positive current terminal (of which 98 is typical) and a negative current terminal (of which 99 is typical), the assemblies 84 connected in series by their current terminals to form a string with string positive terminal 96 and string negative terminal 97.

Each cell assembly such as 84 comprising a first storage cell (of which 82 is typical) and a second storage cell (of which 83 is typical) each having a respective positive and negative terminal (for example terminals 101 and 102), the positive terminal of the first cell (typical 101) defining the positive current terminal (typical 98), the negative terminal of the second cell (typical 104) defining the negative current terminal (typical 99), the negative terminal of the first cell (typical 102) connected with the positive terminal of the second cell (typical 103), thereby defining a node (typical 100).

Each cell assembly such as 84 further comprises an inductor (typical 88) and first and second switches (typical 85 and 86), the inductor 88 having first and second leads (typical 106 and 105 respectively), the second lead 105 of the inductor connected to the node 100, the first lead 106 of the inductor connected by the first switch 85 to the positive terminal 101 of the first cell 82 and connected by the second switch 86 to the negative terminal 104 of the second cell 83.

As communicated by hatching 87, the various inductors 88 are inductively coupled to each other as well as to inductor 89, discussed in more detail below.

A controller 92 is provided, which uses control lines 94 to selectively open and close the various first switches 85 and the various second switches 86 of the cell assemblies 84.

An energy sharer 107 is also shown in FIG. 6. The sharer 107 comprises an inductor 89 inductively coupled (as mentioned above) with the inductors 88 of the cell assemblies 84, the inductor 89 of the sharer 107 connected by at least one switch to an energy sharing bus 91. The controller 92 selectively opens and closes the at least one switch of the sharer 107. In FIG. 6 the connection of the inductor 89 of the sharer 107 to the energy sharing bus 91 is a full-wave bridge comprising four switches 90, and the controller 92 selectively opens and closes the four switches 90 of the full-wave bridge of the sharer 107.

Figure 11:
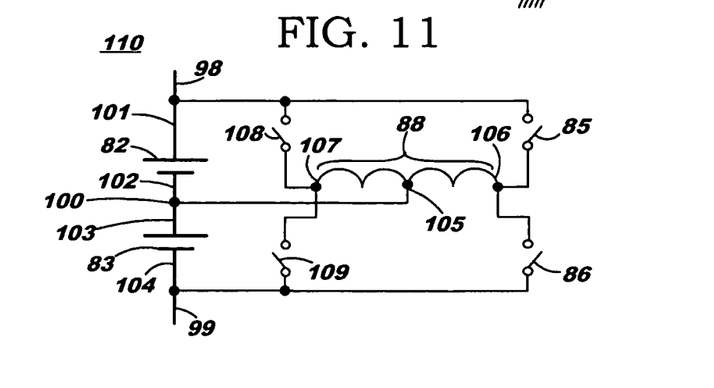
FIG. 11 shows a cell assembly of the second approach in greater detail.

Turning ahead to FIG. 11, what is shown is a cell assembly 110 of a second approach according to the invention in some detail. The cell assembly 110 has two cells 82, 83 in series as discussed above in connection with FIG. 6, defining node 100. Inductor 88 has a third lead 107 which has the same inductive sense relative to the second lead 105 as the inductive sense of the second lead 105 relative to the first lead 106. Each cell assembly 110 further comprises third and fourth switches 108, 109, the third lead 107 connected by the third switch 108 to the positive terminal 101 of the first cell 82 and connected by the fourth switch 109 to the negative terminal 104 of the second cell 83. The controller (92 in FIG. 6, omitted for clarity in FIG. 11) selectively opens and closes the third switches 108 and the fourth switches 109 of the cell assemblies 110.

Figure 7:
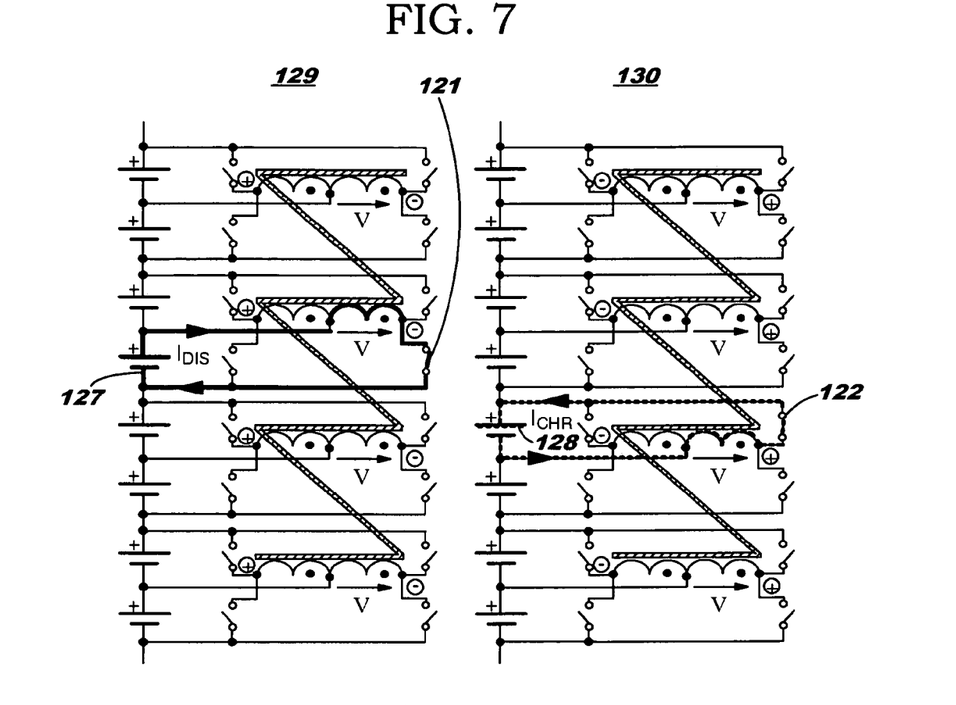
FIG. 7 shows a second approach according to the invention in actual use in a first regime.
Figure 8:
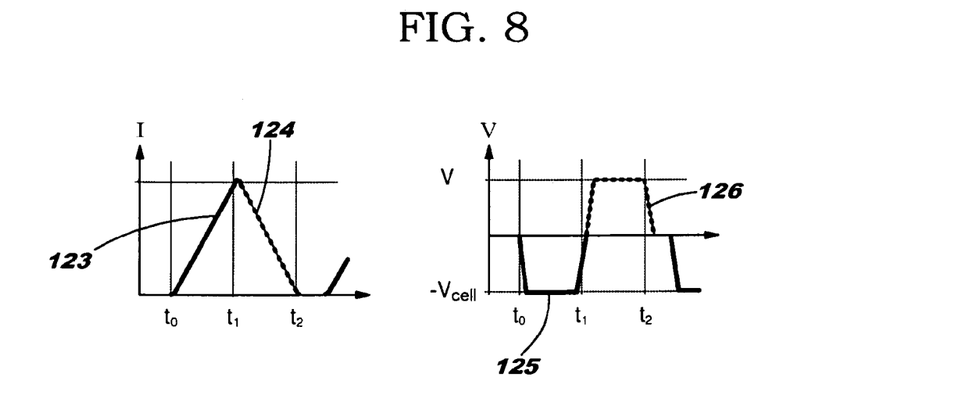
FIG. 8 shows current and voltage plots over time during charge/discharge operations.

FIG. 7 shows the second approach according to the invention in actual use in a first regime. In this figure there are eight cells defining four cell assemblies. There are two switches per cell and one inductor per cell assembly. In this regime, during a first time interval (shown as portion 129) a switch 121 is closed, drawing charge from cell 127. During a second time interval (shown as portion 130) a switch 122 is closed, pumping charge into cell 128. FIG. 8 shows current and voltage plots over time during such charge/discharge operations. Current during the first time interval is shown by plot 123, and current during the second time interval is shown by plot 124. The voltage drawn from cell 127 is shown by plot 125 and the voltage provided to cell 128 is shown by plot 126.

Control of the switches is carried out so that the energy pumped "into" the transformer (which we may think of as the volt-seconds area under a voltage curve as a function of time) is countered by a later extraction of energy back out of the transformer. The two areas (area associated with pumping energy into the transformer and area associated with extracting energy back out of the transformer) need to be the same.

Figure 9:
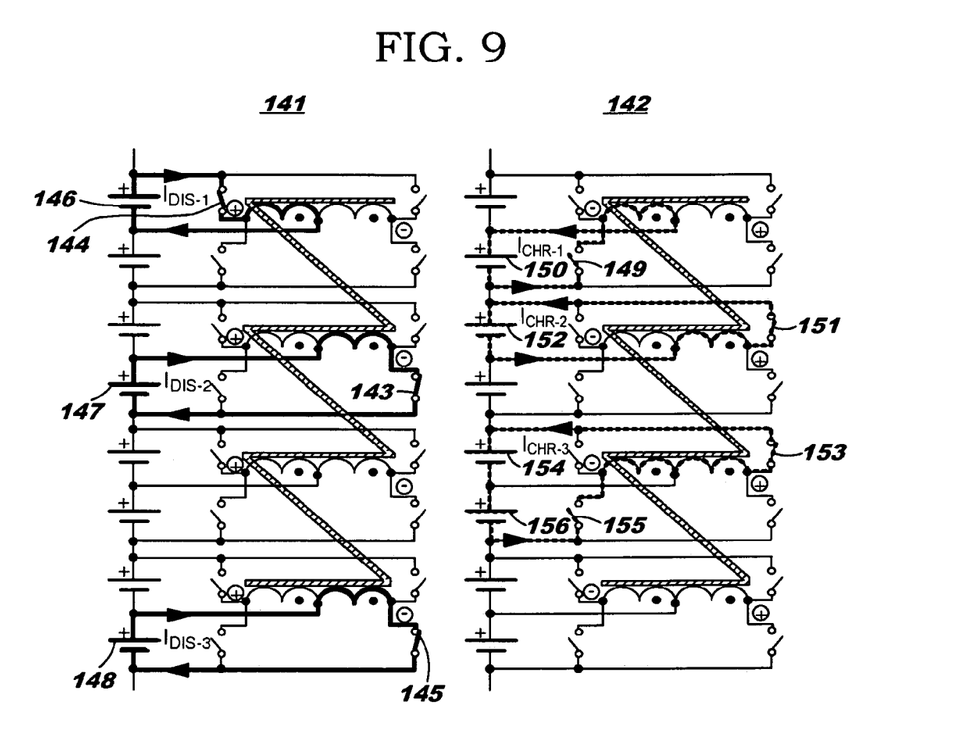
FIG. 9 shows the second approach according to the invention in actual use in a second regime.

FIG. 9 shows the second approach according to the invention in actual use in a second regime. In this figure, as in FIG. 7, there are eight cells defining four cell assemblies, and there are two switches per cell and one inductor per cell assembly. In this regime, during a first time interval (shown as portion 141) switches 144, 143, and 145 are closed, drawing charge from cells 146, 147, and 148. During a second time interval (shown as portion 142) switches 149, 151, 153, and 155 are closed, pumping charge into cells 150, 152, 154, 156.

The thoughtful reader will appreciate from the example regimes of FIGS. 7 and 9 that the topology shown permits almost any combination of charge-discharge actions. Charge could be transferred from a first cell in a first cell assembly to a second cell in a second cell assembly. Charge could be transferred from two different cells (in the same assembly or in different assemblies) to a third cell. Charge could be transferred from one cell to two other cells (in the same assembly or two different assemblies).

Figure 10:
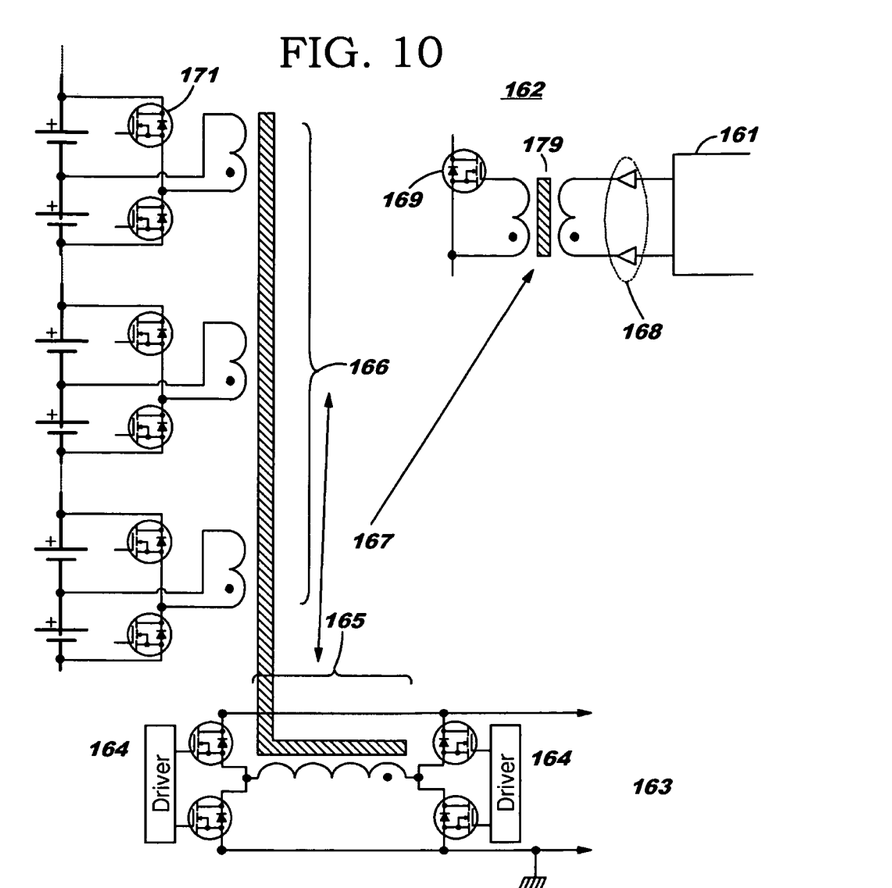
FIG. 10 shows a drive mechanism for driving individual switches in an isolated fashion.

FIG. 10 shows a drive mechanism for driving individual switches in an isolated fashion. The sharer has a single winding 165, and the cell assemblies each have a winding 166. Isolation between the sharer and the cell assemblies, shown at 167, is for example a 1 kilovolt isolation, selected to be well higher than the maximum voltage of the series cell stack and well higher than the maximum voltage provide to the sharer on the energy share bus 163. Traditional high-current half-bridge/full-bridge drivers 164 are provided, "bootstrapped" on the high side.

Each switch 171 is driven by a driver such as driver 162, which is a transformer-coupled driver. A transformer 170 is driven by low-current bipolar drivers 168, controlled by a control field-programmable gate array 161.

While the invention is described with respect to electrochemical storage cells, the teachings of the invention offer themselves equally to other energy storage devices.

The thoughtful reader will have no difficulty, after having considered the teachings herein, devising myriad obvious variants and improvements upon the invention, all of which are intended to be encompassed by the claims which follow.

The invention claimed is:

1. Apparatus comprising:
 a plurality of cell assemblies each having a positive and negative current terminal, the assemblies connected in series by their current terminals,
 each cell assembly comprising first and second storage cells each having a respective positive and negative terminal, the positive terminal of the first cell defining the positive current terminal, the negative terminal of the second cell defining the negative current terminal, the negative terminal of the first cell connected with the positive terminal of the second cell, thereby defining a node;
 each cell assembly further comprising an inductor and first and second switches, the inductor having first and second leads, the second lead of the inductor connected to the node, the first lead of the inductor connected by the first switch to the positive terminal of the first cell and connected by the second switch to the negative terminal of the second cell,
 the inductors of the cell assemblies inductively coupled together,
 the apparatus further comprising a controller selectively opening and closing the first switches and the second switches of the cell assemblies.

2. The apparatus of claim 1 further comprising:
 an energy sharer, the sharer comprising an inductor inductively coupled with the inductors of the cell assemblies, the inductor of the sharer connected by at least one switch to an energy sharing bus,
 the controller selectively opening and closing the at least one switch of the sharer.

3. The apparatus of claim 2 wherein the connection of the inductor of the sharer to the energy sharing bus is further characterized as a full-wave bridge comprising four switches,
 the controller selectively opening and closing the four switches of the full-wave bridge of the sharer.

4. The apparatus of claim 1 wherein each cell assembly is further characterized in that its inductor further comprises a third lead, the third lead having the same inductive sense relative to the second lead as the inductive sense of the second lead relative to the first lead,
 each cell assembly further comprising third and fourth switches, the third lead connected by the third switch to the positive terminal of the first cell and connected by the fourth switch to the negative terminal of the second cell,
 the controller selectively opening and closing the third switches and the fourth switches of the cell assemblies.

5. The apparatus of claim 1 wherein the storage cells are electrochemical storage cells.

6. A method of use of the apparatus of claim 4, the method comprising the steps of:
 closing at least one of the first, second, third, and fourth switches for at least a first storage cell in one of the cell assemblies so as to draw charge from the storage cell connected thereto, said cell defining a first source cell;
 closing at least one of the first, second, third, and fourth switches for at least a second storage cell in one of the cell assemblies so as to cause charge to flow into the storage cell connected thereto, said cell defining a first destination cell;
 whereby charge is transferred from the first source cell to the first destination cell.

7. The method of claim 6 further comprising:
 closing at least one of the first, second, third, and fourth switches for at least a third storage cell in one of the cell assemblies so as to draw charge from the storage cell connected thereto, said cell defining a second source cell;
 whereby charge is transferred from the first source cell and from the second source cell to the first destination cell.

8. The method of claim 6 further comprising:
 closing at least one of the first, second, third, and fourth switches for at least a fourth storage cell in one of the cell assemblies so as to cause charge to flow into the storage cell connected thereto, said cell defining a second destination cell;
 whereby charge is transferred from the first source cell to the first destination cell and to the second destination cell.

* * * * *